United States Patent [19]

Buonauro et al.

[11] 4,237,599
[45] Dec. 9, 1980

[54] TOOL CHANGER ASSEMBLY

[75] Inventors: John A. Buonauro, Mission Viejo; James L. Frazier, Los Alamitos, both of Calif.

[73] Assignee: Houdaille Industries, Inc., Fort Lauderdale, Fla.

[21] Appl. No.: 879,211

[22] Filed: Feb. 21, 1978

[51] Int. Cl.³ .......................................... B23Q 3/157
[52] U.S. Cl. ..................................... 29/568; 414/776; 414/779
[58] Field of Search ............ 29/568; 214/1 BB, 1 BC, 214/1 BD, 1 QF; 414/729, 730, 744, 736, 738, 739, 740, 741, 744 A, 751, 779, 753, 772, 773, 776

[56] References Cited

U.S. PATENT DOCUMENTS

| | | | |
|---|---|---|---|
| 3,242,568 | 3/1966 | Flannery et al. | 29/568 |
| 3,300,856 | 1/1967 | Daugherty | 29/568 |
| 3,339,273 | 9/1967 | Knosp | 29/568 |
| 3,520,050 | 7/1970 | Trebble | 29/568 |
| 3,608,185 | 9/1971 | Pfister | 29/568 |
| 3,619,898 | 11/1971 | Perry et al. | 29/568 |
| 3,760,490 | 9/1973 | Burg | 29/568 |
| 3,990,585 | 11/1976 | Johansson | 29/568 X |
| 3,999,664 | 12/1976 | Frazier | 214/1 BD |
| 4,121,332 | 10/1978 | Corsi | 29/568 |
| 4,126,233 | 11/1978 | Jeske | 214/1 BB |

FOREIGN PATENT DOCUMENTS

| | | | |
|---|---|---|---|
| 2264080 | 7/1974 | Fed. Rep. of Germany | 29/568 |
| 2242195 | 3/1975 | France | 29/568 |

OTHER PUBLICATIONS

*10H/10HC Series N.C. Machining Centers*, Cincinnati Milacron, 1974.
*JMC 340 Jig Mill Machining Center*, DeVlieg Machine Company, 1972.
*Mazak Power Center V-15*, Yamazaki Machinery Works Ltd., 1977.

*Primary Examiner*—Z. R. Bilinsky
*Attorney, Agent, or Firm*—Hill, Van Santen, Steadman, Chiara & Simpson

[57] ABSTRACT

A tool changing mechanism or assembly for a machine tool, which has a spindle for rotating a tool on an operating axis and has a tool storage magazine having at least one tool receiving means such as a socket for supporting a tool on a storage axis, has an improvement which enables increased distances between the spindle and the storage axis. The improvement is that a tool changing arm is mounted on a housing or a shuttle to rotate about a first axis and the shuttle is mounted on the frame of the machine tool so that it can be moved between two linear positions as the arm is rotated so that the axis of rotation of the arm is shifted in a linear path. Preferably, the arm in addition to rotating about a first axis is rotated about a second axis which extends along or parallel to the length of the arm so that the tool may be turned end for end as it is being transferred and the means for shifting the shuttle is driven by the same actuator that rotates the arm so that movement of the arm and shuttle are synchronized. In the preferred embodiment, intermittent motion of the shuttle is obtained by using an intermittent motion mechanism.

16 Claims, 11 Drawing Figures

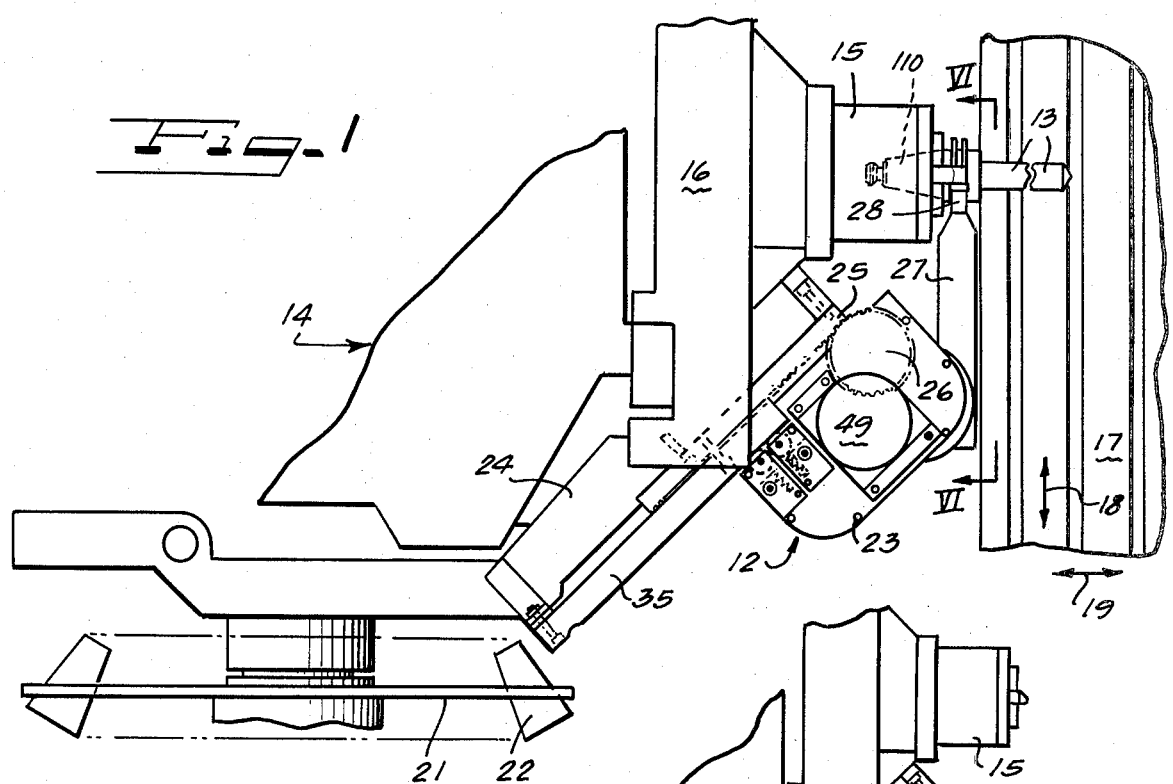
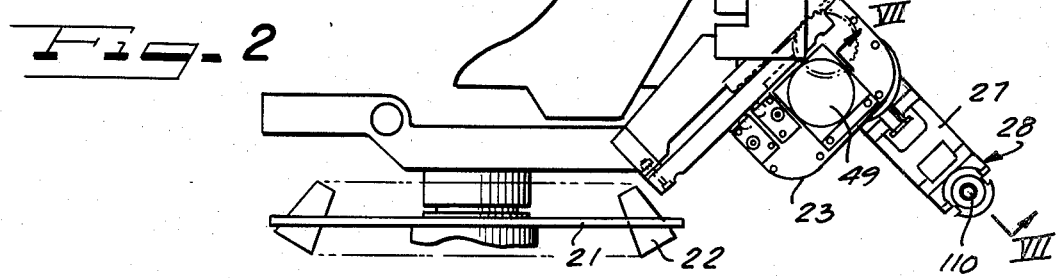
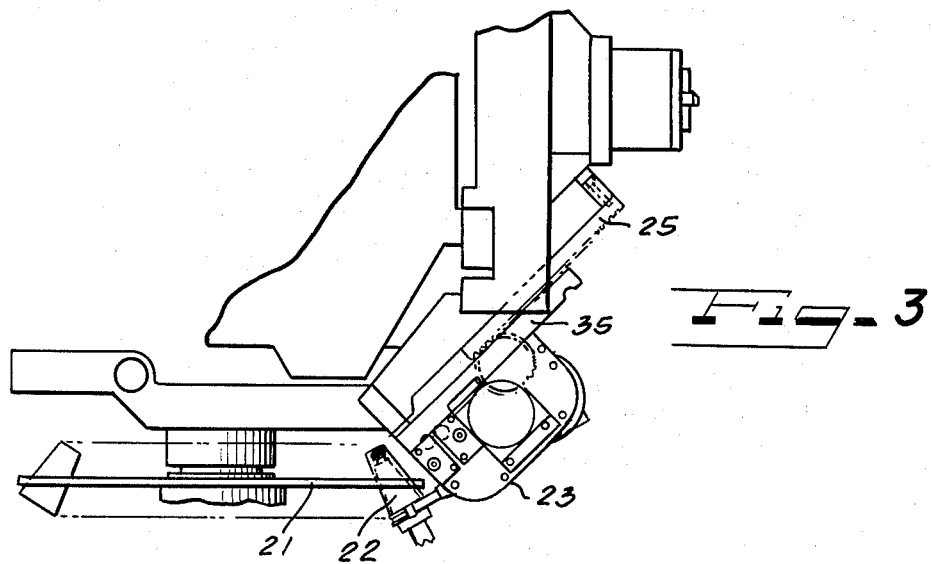

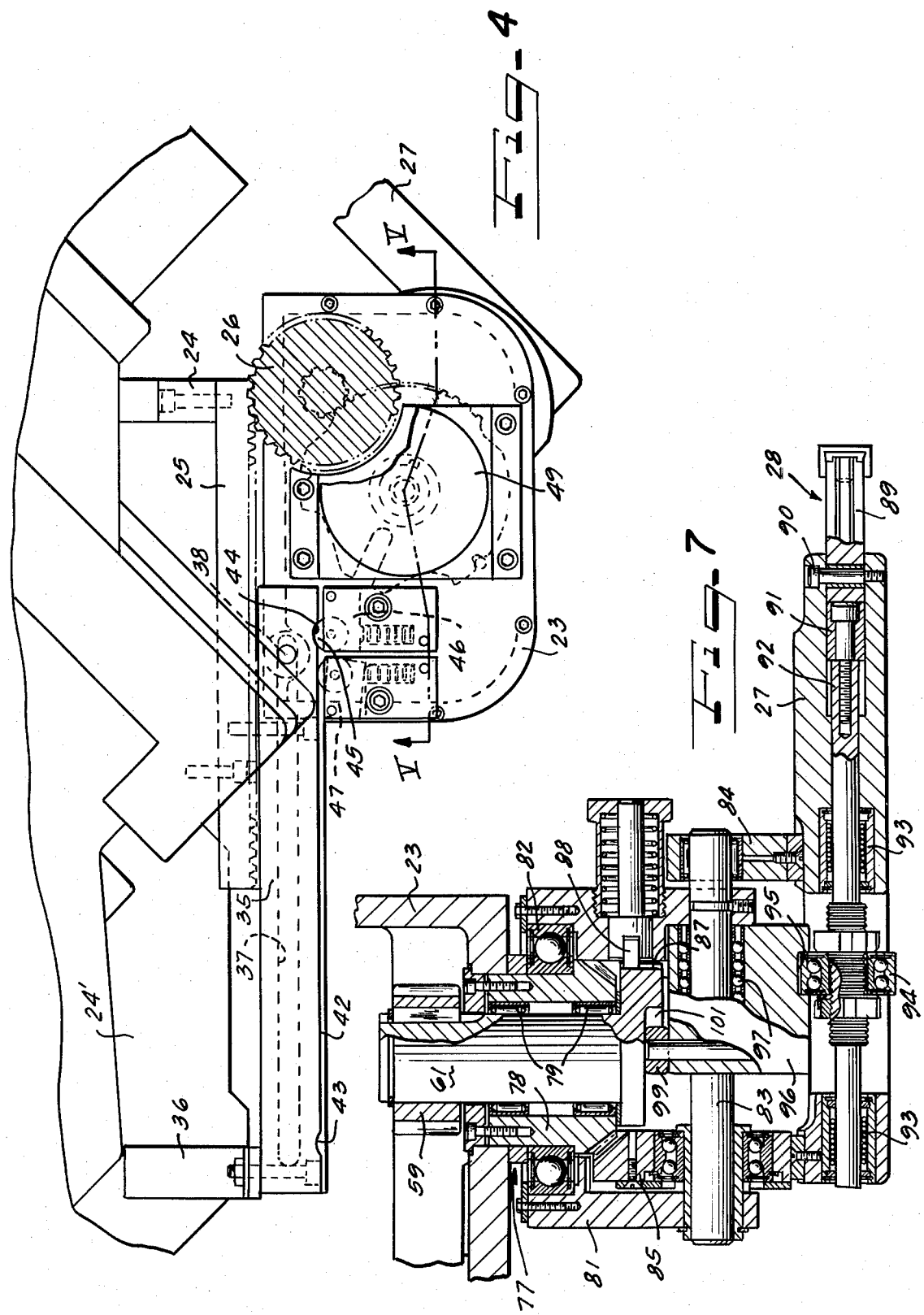

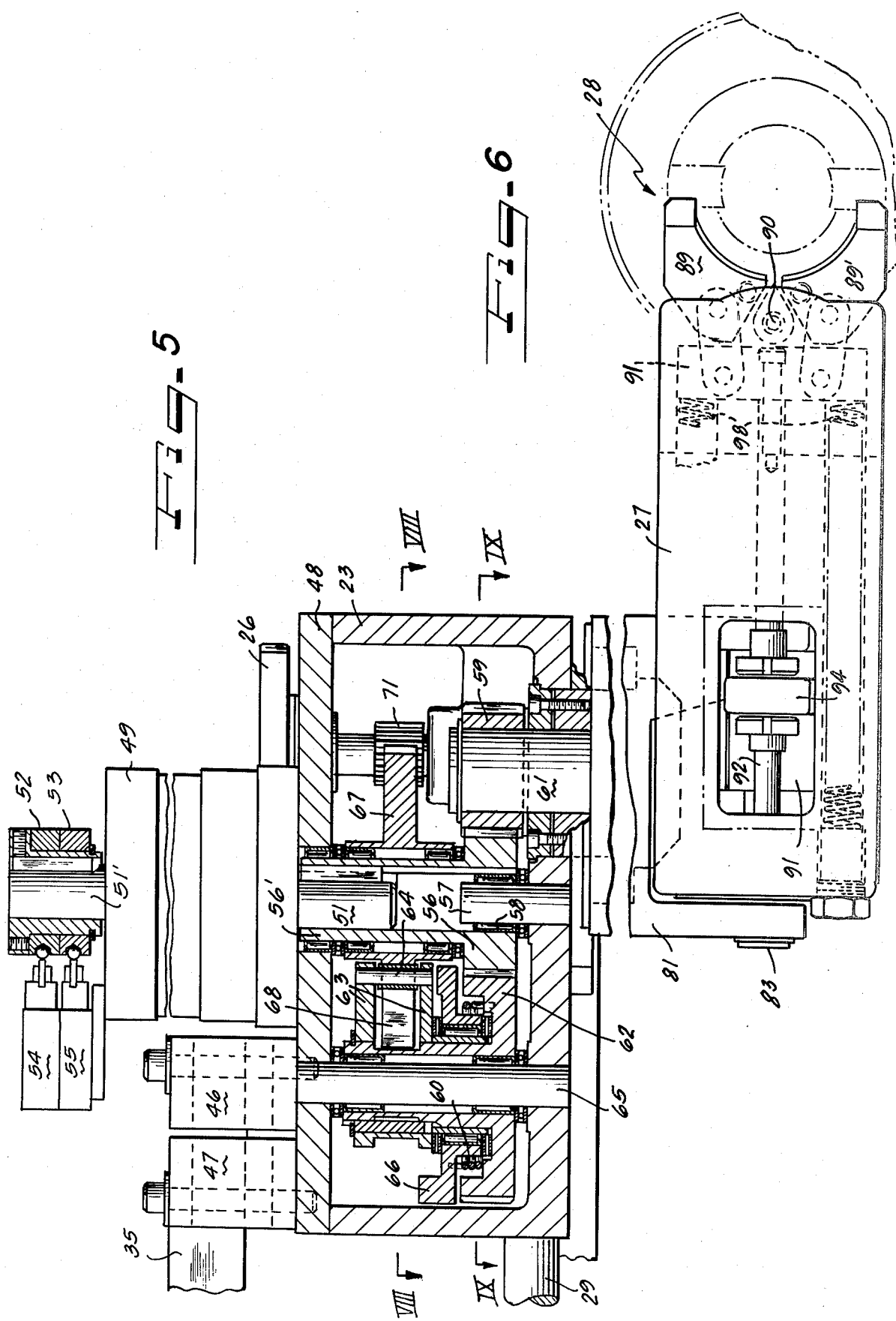

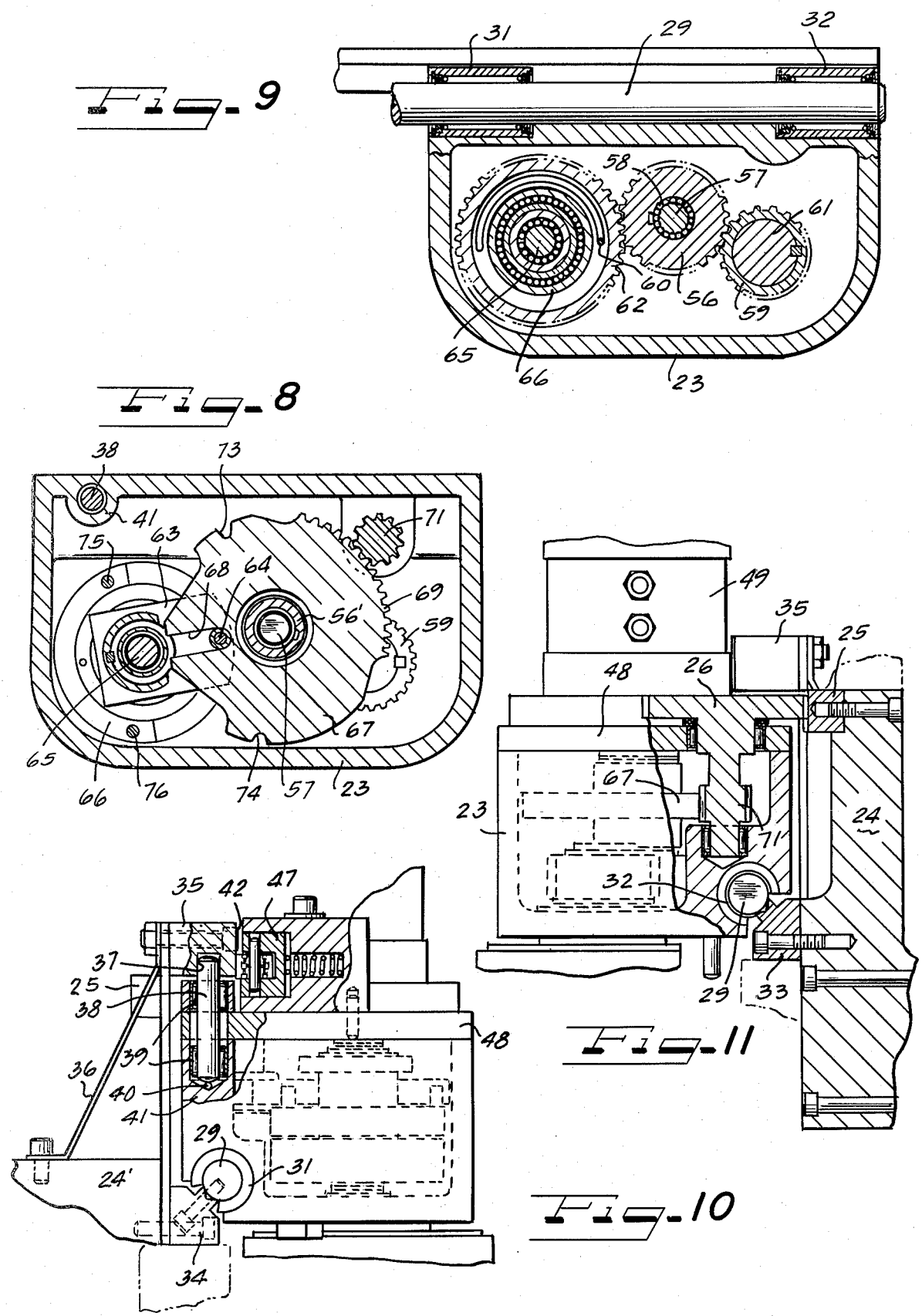

TOOL CHANGER ASSEMBLY

BACKGROUND OF THE INVENTION

1. Field of the Invention

The present invention is directed to an improvement in a tool changing or transport mechanism for a machine tool which mechanism enables changing the tool in the spindle of the machine tool with tools which are normally carried in an adjacent storage structure.

2. Prior Art

In U.S. Pat. No. 3,999,664, a tool changer with a dual axis of rotation is described, and this tool changer had many advantages over the tool changer disclosed in U.S. Pat. No. 3,760,490. The dual axis tool changing mechanism had a transfer arm, which is rotatable on a first axis and enables moving a tool from a spindle of a machine tool to a pocket in a magazine of a storage device. In order to enable inserting the tool in the pocket and also into the spindle, the transfer arm rotates the tool about a second axis which extends along the length of the arm. Thus, during transfer the tool is turned end for end.

While this device has proven extremely satisfactory in many machine tools, problems may occur when the machine tool has an increased size so that the distance between the operating axis defined by the spindle and the storage axis increases. For example, if the length of the transfer arm is increased to enable transferring the tool over a greater distance, the arc of the path of movement of the tool is increased and in some instances, increases problems concerning providing sufficient clearance for movement of the tool during a tool transfer operation.

SUMMARY OF THE INVENTION

The present invention is directed to a tool changing assembly or mechanism which enables movement of the tool over a greater distance without substantially increasing the length of the transfer arm and, therefore, without increasing problems with providing clearance for the tool during transfer operation. To accomplish these tasks, the present invention is directed to a tool changing mechanism for a machine tool having an operating axis on which a tool is operable and a tool storage structure having a tool receiving means for supporting a tool in a storage axis. The tool changing mechanism has a transfer arm with gripper means for holding a tool at one end and with means for mounting the other end of the transfer arm for rotation on an axis of rotation, and means for rotating the transfer arm on the axis of rotation between a position with the gripper means engageable with the tool disposed on the operating axis and a second position with the gripper means disposed for engaging a tool on said storage axis. The improvements comprise translating means for moving the means for mounting the axis of rotation along a given linear path extending between the operating axis and the storage axis with the path having a point adjacent the storage axis and extending toward a point adjacent the operation axis as the transfer arm is rotated to move the gripper means between said positions. Preferably, the translating means includes means to begin the linear movement after the initial rotation of the transfer arm between the position and completes this linear movement prior to the end of said rotation.

Preferably, the machine tool has a spindle for rotating the tool on the operating axis and the transfer arm in addition to being rotated on a first axis is also rotated on the second axis which extends along or is parallel to the length of the arm so that the tool as it is moved between the two positions is turned 180° or end over end.

The means for rotatably mounting the transfer arm is preferably on a housing of a shuttle which housing of the shuttle is mounted for sliding linear movement on a portion of the frame of the machine tool. The means for shifting the first axis of rotation moves the housing of the shuttle between two linear points or positions and is preferably formed by a rack gear mounted on the frame portion of the machine tool and a pinion mounted for rotation on the housing of the shuttle. The means for rotating the pinion which engages the rack gear is preferably an intermittent mechanism similar to a Geneva mechanism and is composed of a crank that is rotated by an actuator which also is connected by a gear train to rotate the transfer arm. The crank carries a pin which is moved in an arcuate path about its axis of rotation and engages a radial slot in a gear member which is in driving engagement with the pinion. By selecting the configuration of the gear member with the slot and the crank, the gear member is not rotated during initial movement of the actuator or the final movement of the actuator so that the linear movement of the shuttle begins after the initial rotational movement of the transfer arm and is completed prior to the last rotational movement of the transfer arm.

Many other advantages, features and additional objects of the present invention will become manifest to those versed in the art upon making reference to the detailed description and accompanying drawings in which a preferred structural embodiment incorporating the principles of the present invention is shown as illustrative example.

BRIEF DESCRIPTION OF THE DRAWINGS

FIG. 1 is a partial plan view of a machine tool having a tool changing mechanism or tool changer of the present invention engaging a tool in a spindle of the machine tool;

FIG. 2 is a partial plan view similar to FIG. 1 illustrating a tool changing mechanism in a mid-position during a tool changing operation;

FIG. 3 is a partial plan view similar to FIG. 1 showing the tool changing mechanism in a position for engaging a tool in a pocket of a magazine which forms a tool receiving means;

FIG. 4 is an enlarged plan view of the tool changer of the present invention as illustrated in FIG. 1 with portions broken away for purposes of illustration;

FIG. 5 is a cross-sectional view, with portions in elevation for purposes of illustration, taken along lines V—V of FIG. 4 when the tool changer is in a middle position during a tool changing operation such as illustrated in FIG. 2;

FIG. 6 is an enlarged view of the transfer arm taken from lines VI—VI of FIG. 1;

FIG. 7 is a partial cross-sectional view taken along lines VII—VII of FIG. 2;

FIG. 8 is a partial cross-sectional view taken along lines VIII—VIII of FIG. 5;

FIG. 9 is a partial cross-sectional view with portions broken away for purposes of illustration taken along lines IX—IX of FIG. 5;

FIG. 10 is a partial end view taken from the left hand side of FIG. 4; and

FIG. 11 is an end view with portions broken away taken from the left hand side of FIG. 4.

DESCRIPTION OF THE PREFERRED EMBODIMENTS

The principles of the present invention are particularly useful in a tool changing mechanism or tool changer generally indicated at 12 in FIG. 1 for changing and transferring a tool 13 for a machine tool generally indicated at 14.

As illustrated, the machine tool 14 has a spindle 15, which is disposed in a head 16, which slides vertically on a frame of the machine tool. The spindle 15, which is driven by a drive source (not illustrated), will receive the tool 13 and will rotate the tool in a horizontal operating axis. In order to obtain relative movement between the tool such as 13 and a workpiece, which is mounted either directly on a table 17 of the machine tool or in a fixture secured on the table, the machine tool 14 may have means for shifting the table 17 in one or more directions indicated by the arrows 18 and 19.

To store a tool which is not in use, the machine tool 14 has tool storage means, which is illustrated as a circular magazine 21, which is mounted on the head 16 for rotation about a horizontal axis. The magazine 21 is provided with a plurality of pockets 22, which form individual tool receiving means. Conventional means (not illustrated), are provided for rotating the magazine 21 so that at least one socket or pocket 22 is presented on a storage axis so that a tool received therein can be transferred to the spindle 15 or in the alternative a tool in the spindle 15 can be transferred for insertion in the pocket.

The tool changer or tool changing mechanism 12 includes a shuttle housing or member 23, which is mounted for sliding movement on a portion 24 of the frame of the machine tool 14 and as illustrated the portion 24 is part of the head 16. To shift the shuttle housing or member 23 on the frame portion 24, means comprising a rack gear 25 and a pinion 26 is provided. As illustrated, the rack gear 25 is mounted on the portion 24 and the pinion gear 26 is mounted for rotation on the shuttle housing or member 23.

The tool changer 12 also includes a transfer arm 27, which at one end has gripper means 28 for releasably holding or gripping a tool 13. The other end of the arm 27 is mounted for rotation on the housing 23 by means which included an actuator 49 and will be discussed hereinafter.

The mounting of member 23 is best illustrated in FIGS. 4, 9, 10 and 11. The housing or member 23 is slidably received on a cylindrical shaft or rod 29 by open linear bearings 31, 32 (FIG. 9). The shaft or rod 29 is secured on the frame of the machine tool 14 by blocks such as block 33 (FIG. 11) secured by a threaded fastener to a member 24 and a block 34 (FIG. 10) secured to a frame member or portion 24'. The rack gear 25 is also secured by threaded fasteners on the member 24. Above the rack member, a guide member 35, is secured to brackets such as 36 extending from frame member 24' and a portion of the guide member overlaps a portion of the rack gear 25 (FIG. 4).

The guide member 35 has an elongated groove 37 in a bottom surface and the groove 37 receives the end of a dowel pin 38, which is mounted by a plurality of needle bearings 39 and a single ball 40 (FIG. 10) for relative rotation in a boss 41 (FIG. 8) of the housing member 23. The member 35 on a front surface 42 (as best illustrated in FIG. 4) has a detent 43 at one end adjacent the bracket 36 and a second detent 44 adjacent the opposite end. The detent 44 receives the roller or follower 45 of a spring bias detent assembly 46 while the detent 43 receives a roller or follower of a spring bias detent assembly 47. The detent assemblies 46 and 47 are mounted on a lid or cover 48 of the housing 23, with an actuator 49. Thus, the shaft 29 and the open linear bearings 31, 32, the dowel pin 38 in the slot 37, and the detent assemblies 46, 47 all coact to support the housing 23 for movement along a linear path relative to the frame of the machine tool 14. It should be noted that the detent assemblies 46, 47 help hold the housing 23 in each of the end positions or points of its linear travel.

As best illustrated in FIG. 5, the actuator 49 has a shaft 51 which extends from both ends. The upper end 51' supports a pair of trips 52, 53 which coact with switches 54, 55 to determine the angular position of the shaft 51. The actuator 49 is a hydraulic vane-type actuator in which the vane is rotated back and forth through a portion of an arc. The shaft 51 is keyed to a hollow shaft of a gear 56, which is supported in the housing 23 at the opposite end by a dowel 57 and bearings 58. The gear 56 engages a spur or pinion gear 59, which is keyed to a shaft 61 of means for rotating the arm 27 about an axis.

In addition, the gear 56 engages a gear 62 having a crank 63 with arms which support a pin 64 for movement in an arc about an axis of a shaft 65. The gear 62 is free to rotate on the shaft 65 by appropriate bearings and is coupled or connected through a torsion spring 60 to a stop mechanism 66. A gear member 67 (best illustrated in FIG. 8) is mounted for rotation on an extended shaft or hub 56' of the gear 56. The gear member 67 has a single radial slot 68 for receiving the pin 64 of the crank 63. The gear member 67 is provided with a sector 69 of gear teeth which engage a spur gear 71. The gear 71 is a shaft with the pinion gear 26 (FIG. 11) and the gear unit of the pinion 26 and gear 71 on the shaft is mounted by appropriate bearings for rotation in the housing 23. Thus, rotation of the gear member 67 on the hub 56' rotates the pinion gear 26 which engages the rack gear 25 to shift the housing 23 linearly along the rack gear 25 and guide member 35. The coaction of the crank 63 and the gear member 67 forms a mechanism for intermittent rotational movement which is similar to a Geneva type mechanism. It should be noted that due to the actuator 49 and the gear reduction between the gear 56 and 62, the crank 63 is only rotated through approximately 180° with the pin 64 being oscillated in an arc.

To lock and hold the intermittent movement mechanism formed by the gear member 67 and the crank 63, stop means are provided. As illustrated in FIG. 8, the stop means include notches 73 and 74 on the gear member 67 and a pair of annularly-spaced pins 75 and 76 which are attached to the stop member 66. Thus, as the crank approaches its maximum point of movement in a clockwise direction, the pin 64 is removed from the slot 68 and the pin 75 is moved into engagement in the notches 73 to lock or hold the gear member 67 in a fixed position on the path of movement which position is illustrated in FIG. 3. In a similar manner, when the crank 63 has been rotated in the counterclockwise direction and approaches the maximum movement, the pin 64 will again be withdrawn from the slot 68 and the pin 76 will be engaged in the notch 74 to lock the gear member 67 in a fixed position which will have the housing 23 in the linear position illustrated in FIG. 1. Due to the coupling of the member 66 by a torsion spring 60 to the gear 62, the gear 62 and crank 63 can move through a limited arc after the engagement of either pin 75 or 76 in its respective notch 73 or 74 to lock the gear member 67 against rotation. This allows for movement of the arm 27 by the actuator 49 as the shuttle housing 23 is held in a locked position.

As mentioned hereinabove, the actuator through the gear 56 also drives the pinion 59 keyed to a shaft 61. The shaft 61 is part of means for rotating the transfer arm 27, which, as best illustrated in FIG. 7, is mounted for rotation about a fixed axis relative to the housing 23 by means generally indicated at 77. The means 77 includes a bevel gear 78, which is keyed into the base of the housing 23 and has a hollow hub through which the shaft 61 extends and is supported for rotation by bearings 79. A hub or base member 81 is supported for rotation by a ball bearing 82 on the outer portion of the bevel gear 78. The hub member 81 has a shaft 83, which extends transverse to the axis of shaft 61. The arm 27 has two spaced members 84 and 85 which are supported by bearing for rotation on the shaft 83 so that the arm 27 can rotate about the axis of the shaft 83, which is parallel to the length of the arm. The member 85 is provided with at least a portion of a bevel gear engaging the bevel gear 78.

The end of the shaft 61 has a notch or groove 87, which receives a spring loaded detent 88 to releasably interconnect the base member 81 with the shaft 61. Thus, rotation of the shaft 61 will rotate the base member 81 on the bevel gear 78 and swing or rotate the arm 27 on an axis defined by the axis of the shaft 61. Due to coaction of the bevel gear of the member 85 and the bevel gear 78, rotation of the arm about the axis of the shaft 61 will also cause rotation of the arm on a second axis defined by the shaft 83 which axis is substantially parallel to the longitudinal length or axis of the arm 27.

As best illustrated in FIGS. 6 and 7, the gripper means 28 has two jaws 89 and 89' pivotally connected to the arm 27 by a pin 90. Each of jaws 89, 89' is pivotally connected to a member 91 by links 100, 100'. The member 91 is attached to a rod 92, which is mounted in the arm by linear bearings 93, 93 (FIG. 7) for axial movement. The rod 92 supports a follower comprising a race of a bearing 94, which is received in a groove 95 of a member 96. The member 96 is mounted by a bearing 97 for axial movement along the shaft 83. Springs 98 (FIG. 6) acting on the block 91 hold the jaws 89, 89' of the gripper means 28 in the closed or gripping position. The member 96 has followers 99 which engage an eccentrically disposed cam surface 101 of the shaft 61. Thus, when rotational movement of the base member 81 is prevented due to engaging a stop, the continual movement of the shaft 61 has the cam surface 101 acting on a follower 99 to shift the member 96 on the shaft 83 against the force of the springs 98. As the member 96 moves against the spring 98, links 100, 100' pivot the jaws 89, 89' on pin 90 to open the gripper means 28.

A description of the operation of the tool changing mechanism or tool changer 12 will begin with it in a rest position, which is illustrated in FIG. 1. In the rest position, the jaws 89, 89' are in an open position surrounding an adapter 110 of tool 13 disposed in the spindle 15. When in this position, the pinion gear 26 has been rotated to its maximum extent in a counterclockwise direction due to the crank 63 (FIG. 8) being moved to its maximum counterclockwise direction and the locking pin 76 will be engaged in the notch 74 to prevent movement of gear member 67 and to hold the shuttle 23 in a first position or point. When the control system of the machine tool 12, which system may be a conventional system, starts the actuator 49, the jaws of the gripper means 28 close on the adapter 110 of the tool 13 which is released from the spindle 15. Then the arm 27 will begin to rotate about its fixed axis relative to the shuttle 23. After the arm 27 has moved or pivoted through an arc sufficient to remove the tool 13 and tool adapter 110 from the spindle 15, which arc may be approximately 15° to 20°, the shuttle housing 23 will begin to be translated along its linear path which is formed by the rack 25 and guide member 35 and extends between the spindle 15 and the storage pocket 22. This delay in movement is due to the fact that the crank 63 moves through a given angle before the pin 64 is engaged in the slot 68 to cause rotation of the gear member 67. As the crank 63 initiates its beginning rotation, the locking pin 76 is held in the notch 74 by the biasing force of the spring 60, but when the pin 64 moves into the slot 68, the pin 76 is withdrawn from the notch 74 to release gear member 67 for rotational movement.

As the crank continues to move toward a position such as illustrated in FIG. 8, the pinion 26 is rotated to shift the shuttle housing 23 along the linear path to a position illustrated in FIG. 2. During this movement, the arm 27 has rotated through slightly more than 90° and due to the coaction of the bevel gears 78 with the bevel gear of the member 85, the arm 27 has been rotated approximately 90° on the axis formed by the shaft 83. Thus, the tool 13 has been turned approximately 90° from the position illustrated in FIG. 1, so that the tool is pointing down as viewed in FIG. 2 and the end of the adapter 110 is pointed up. Continual movement of the crank 63 continues the rotation of the gear member 67 to rotate the pinion 26 to move the housing 23 toward the other or second position illustrated in FIG. 3. As the crank 63 reaches or approaches its furthest position in a clockwise direction (as viewed in FIG. 8), the pin 64 leaves the groove 68 so that the crank is disengaged from gear member 67. As the pin 64 leaves the groove 68, the locking pin 75 moves into the notch 73 to hold and lock the gear member 67 in a fixed position and therefore locks the shuttle 23 in a fixed position with respect to the frame of the machine tool 14. Due to the torsion spring 60, the crank 63 can continue to rotate as the arm 27 completes its movement. It should be noted that the detent assembly 46 and 47 engaging their respective grooves or detents 44 and 43 coact with the locking pins of a locking means of the intermittent drive mechanism to hold the housing 23 in its two positions.

With the housing 23 in the position illustrated in FIG. 3, the transfer arm 27 has been rotated through approximately 180° along the axis 83 and its approaching the maximum amount of rotation along the first axis defined by the shaft 61. Continual rotation of the arm 27 on the first axis inserts the adapter 110 into the socket 22 which is on the supply axis and has conventional detent means to engage the adapter to hold the tool in the socket. With the insertion of the tool in the socket, the arm 27 is prevented from further rotation; however, continual rotation of the shaft 61 causes the jaws 89, 89' of gripper means 28 to pivot open to release the tool.

With the jaws of the gripper means in the released or open position, the magazine 21 can be rotated or indexed to present a new socket 22, which contains a new tool, at the supply axis. When the actuator 49 is moved in the reversed direction, the jaws of gripper means 28 closes upon the new tool and the initial rotation of the arm 27 will remove the tool from the socket. After the arm 27 has moved through an initial arc to remove the tool from the socket, the intermittent drive means comprising the crank 63 with the pins 64 engaged in the slot 68 of the gear member 67 will cause the pinion 26 to carry the housing 23 from the position illustrated in FIG. 3 through the position illustrated in FIG. 2 toward the position illustrated in FIG. 1. After the housing 23 assumes the position in FIG. 1, the arm 27 combines to rotate to insert the new tool in the spindle 15 and then the gripper means releases the new tool.

If the rotation of arm 27 through the arc between the portion of FIG. 1 to the portion of FIG. 3 is considered a stroke, then during a tool changing operation, the arm 27 moves through a first stroke to remove a tool from the spindle and place it in the socket 22, and after a new tool is present on the supply axis, the arm moves through a return stroke to remove the new tool from the socket and insert it in the spindle. During each stroke, the shuttle housing 23 begins its movement on the linear path after a predetermined arcuate movement of the arm 27 and the arm 27 continues movement through a predetermined arc after completion of the linear movement of the shuttle housing 23. Thus, during each stroke, the housing 23 is stationary for the initial and final arcuate segments of the movement of the arm 27. In the illustrated embodiment, the arcuate segments are preferably equal so that the arm 27 travels through the same angle after the shuttle stops moving as it did before the shuttle was moved. To accomplish this relationship, the crank 63 during each stroke moves through the same angle after the pin 64 is disengaged from slot 68 as it did before the pin was engaged in the slot.

While the invention in the broadest sense can utilize separate actuators to rotate the transfer arm 27 and to move the housing 23 along the linear path, the use of a single actuator 49 with the intermittent mechanism of the preferred embodiment eliminates many problems of synchronizing two separate actuators and eliminates the need of providing feedback means for the control system to indicate when the shuttle housing 23 has reached one of its two designated positions. In the preferred embodiments described hereinabove, the intermittent movement mechanism formed by the crank 63 with the pin 64 and the gear member 67 is mechanically linked with the means for rotating the transfer arm 27 and the intermittent movement means provides the desired pause or delays in the linear movement at both the beginning and the end of each stroke so that the tool is completely removed and clear of either the spindle or the socket before the housing 23 is shifted along its linear path.

It should be pointed out that the operation of the transfer arm 27 as it is rotated around the shaft or the axis of the shaft 61 and also rotated around the axis of the shaft 83 is explained in greater detail in U.S. Pat. No. 3,999,664.

Although various minor modifications may be suggested by those versed in the art, it should be understood that we wish to embody within the scope of the patent warranted hereon, all such modifications as reasonably and properly come within the scope of our contribution to the art.

We claim:

1. In a tool changing mechanism for a machine tool having an operating axis on which a tool is operable and a tool storage structure having a tool receiving means for supporting a tool on a storage axis, said tool changing mechanism having a transfer arm with gripper means for holding a tool at one end, means for mounting the other end of the transfer arm for rotation on a first axis of rotation, said transfer arm including means for rotating the gripper means about a second axis, and means for rotating the transfer arm on the first axis of rotation between a position with the gripper means engageable with a tool disposed on the operating axis and a second position with the gripper means disposed for engaging a tool on said storage axis, the improvement comprising translating means for moving the means for mounting and the first axis of rotation along a given linear path extending from a point adjacent the storage axis and a point adjacent the operating axis as the transfer arm is rotated to move the gripper means between said positions, said translating means including means for beginning said movement after the initial rotation of the transfer arm between the positions and completing said movement prior to the end of said rotation.

2. In a tool changing mechanism for a machine tool having an operating axis on which a tool is operable and a tool storage structure having a tool receiving means for supporting a tool on a storage axis, said tool changing mechanism having a transfer arm with gripper means for holding a tool at one end, means for mounting the other end of the transfer arm for rotation on a first axis of rotation, said transfer arm including means for rotating the gripper means about a second axis, and means for rotating the transfer arm on the first axis of rotation between a position with the gripper means engageable with a tool disposed on the operating axis and a second position with the gripper means disposed for engaging a tool on said storage axis, the improvement comprising translating means for moving the means for mounting and the first axis of rotation along a given linear path as the transfer arm is rotated to move the gripper means between said positions, said translating means including a member mounted for slidable movement along a linear path on a frame of the machine tool extending from a point adjacent the storage axis toward the operating axis and means for shifting the member between two points on said path, said means for shifting including means for beginning said movement after the initial rotation of the transfer arm between the positions and completing said movement prior to the end of said rotation, said means for mounting the other end of the transfer arm being disposed on said member so that as the member is shifted along the linear path, the first axis of rotation of the transfer arm is moved along said given linear path.

3. In a tool changing mechanism according to claim 2, wherein said means for shifting said member includes a rack and pinion gear mechanism.

4. In a tool changing mechanism according to claim 3, wherein the rack gear is disposed on the frame of the machine tool and said pinion engaging the rack is disposed on said slidable member, and wherein means for rotating said pinion is disposed on said member.

5. In a tool changing mechanism according to claim 4, which includes means for synchronizing the means for rotating the pinion with the means for rotating the transfer arm.

6. In a tool changing mechanism according to claim 5, wherein the means for rotating the pinion and the means for rotating the arm are driven by a single actuator and said means for synchronizing comprises a drive linkage connected to said actuator and transferring rotational motion from the actuator to each of said means for rotating the pinion and means for rotating the arm.

7. In a tool changing mechanism according to claim 6, wherein the drive linkage includes a gear train transferring rotatable motion from the actuator to the means for rotating the transfer arm and includes an intermittent movement mechanism connecting the output of the actuator to the pinion gear.

8. In a tool changing mechanism according to claim 7, wherein the intermittent movement mechanism includes a crank having a pin arranged to rotate about an axis, said crank being driven by the actuator, a gear member engaged with a gear train for the pinion gear, said gear member having a radial slot for receiving said pin of the crank, and said actuator rotating said crank through an arc greater than an arc of engagement of the pin in the radial slot so that movement of the gear member starts after rotation of said arm and is completed prior to the end of the rotation of said arm.

9. In a tool changing mechanism according to claim 8, wherein the intermittent movement mechanism includes means for locking said mechanism in the two end positions.

10. In a tool changing mechanism for a machine tool having a spindle for rotating a tool on an operating axis and a tool storage structure having a tool receiving means for supporting a tool on a storage axis, said tool changing mechanism having a transfer arm with gripper means for releasably holding a tool at one end and means for mounting the other end of the arm for rotation on a first axis of rotation, said arm having means enabling the gripper means to rotate about a second axis of rotation parallel to the length of said arm, said tool changing mechanism having means for rotating the transfer arm on the first axis of rotation between a position with the gripper means engageable with a tool disposed in the spindle and a second position with the gripper means disposed for engaging a tool on said storage axis, said means for rotating simultaneously rotating the gripper means on said second axis so that a tool in the gripper means is turned end for end to enable axial insertion and removal at both the spindle and the tool receiving means, and means interconnecting the gripper means and the means for rotating the transfer arm so that the gripper means is actuated as the transfer arm reaches each of said positions, the improvements comprising said means for mounting being disposed on a housing which supports the means for rotating, said housing being mounted on a portion of a frame of the machine tool for movement along a linear path extending from adjacent the storage axis toward the spindle, and means for moving said housing between two points on said linear path during a portion of the rotation of said arm on said first axis so that during rotation of said arm between said positions, said first axis of rotation is shifted in a linear direction between two points on said path so that the path of movement of the gripper means has both linear and curvilinear components.

11. In a tool changing mechanism according to claim 10, wherein the means for moving said housing includes a rack gear mounted on one of said portion of the frame and housing, a pinion mounted for rotation on the other of said portion of the frame and housing engaging said rack gear and means for rotating said pinion.

12. In a tool changing mechanism according to claim 11, wherein the rack gear is disposed on the portion of the frame of the machine tool and said pinion and said means for rotating said pinion are disposed on said housing.

13. In a tool changer mechanism according to claim 12, wherein said means for rotating said pinion and said means for rotating the transfer arm each receive rotational drive movement from a single common actuator so that said means for rotating the transfer arm and the means for rotating the pinion are synchronized to move together.

14. In a tool changer mechanism according to claim 13, wherein said actuator provides a rotary drive movement for less than a complete circle in opposite directions, said actuator being directly connected by a gear train to said means for rotating the transfer arm and connected to the pinion of the rack and pinion arrangement by an intermittent motion mechanism.

15. In a tool changer mechanism according to claim 14, wherein the intermittent motion mechanism includes a crank with a pin mounted for rotation, a gear member mounted for rotation and in driving engagement with the pinion, said gear member having a single radial slot for receiving said pin as the crank transfers rotational movement to the gear member and pinion, said crank and gear member being configured and arranged so that during actuation of the actuator to rotate the crank, the initial and final movement of the crank does not cause rotation of said pinion.

16. In a tool changer mechanism according to claim 15, wherein the intermittent motion mechanism includes stop means for locking the gear member and pinion against rotational movement at the end of each stroke.

* * * * *